US012451639B2

(12) United States Patent
Daily et al.

(10) Patent No.: US 12,451,639 B2
(45) Date of Patent: Oct. 21, 2025

(54) HERMAPHRODITIC ADVANCING ELECTRICAL CONNECTOR

(71) Applicant: TE Connectivity Solutions GmbH, Schaffhausen (CH)

(72) Inventors: Christopher George Daily, Harrisburg, PA (US); Matthew Edward Mostoller, Hummelstown, PA (US)

(73) Assignee: TE Connectivy Solutions GmbH (CH)

( * ) Notice: Subject to any disclaimer, the term of this patent is extended or adjusted under 35 U.S.C. 154(b) by 422 days.

(21) Appl. No.: 17/964,252

(22) Filed: Oct. 12, 2022

(65) Prior Publication Data

US 2023/0253727 A1 Aug. 10, 2023

Related U.S. Application Data

(60) Provisional application No. 63/308,098, filed on Feb. 9, 2022.

(51) Int. Cl.

*H01R 13/453* (2006.01)
*H01R 13/631* (2006.01)
*H01R 24/84* (2011.01)
*H01R 13/28* (2006.01)

(52) U.S. Cl.

CPC ......... *H01R 13/453* (2013.01); *H01R 13/631* (2013.01); *H01R 24/84* (2013.01)

(58) Field of Classification Search

CPC .............. H01R 13/453; H01R 13/4532; H01R 13/4534; H01R 13/4536; H01R 13/631; H01R 13/28; H01R 24/84; H01R 13/447–4538

USPC ......................................... 439/136, 284, 137

See application file for complete search history.

(56) References Cited

U.S. PATENT DOCUMENTS

| | | | | |
|---|---|---|---|---|
| 4,162,816 A * | 7/1979 | Malsot | H01R 13/64 | 439/246 |
| 4,217,019 A * | 8/1980 | Cameron | H01R 13/44 | 439/138 |
| 4,990,099 A * | 2/1991 | Marin | H01R 13/642 | 439/221 |
| 5,215,477 A * | 6/1993 | Weber | H01R 24/52 | 439/581 |
| 2013/0023149 A1* | 1/2013 | Galasso | H02G 3/185 | 439/527 |
| 2014/0057468 A1* | 2/2014 | Temmesfeld | H01R 13/639 | 439/133 |

* cited by examiner

*Primary Examiner* — Christopher M Koehler
*Assistant Examiner* — Gregory L Mangot

(57) ABSTRACT

An electrical connector includes a housing having a hermaphroditic mating interface configured to be mated with a mating electrical connector having an identical mating interface. The housing a contact shroud at the mating end with openings at the front. A contact assembly is received in the contact cavity with mating ends of contacts aligned with corresponding openings and defining a hermaphroditic contact interface. The electrical connector includes a retractable cover located at the contact shroud to close the openings that is movable relative to the housing between a closed position and an open position. A cover actuator is coupled to the housing including a pusher and an actuation element operably coupled to the retractable cover. The pusher is configured to interface with a complimentary actuation element of the mating electrical connector to actuate a retractable cover of the mating electrical connector.

22 Claims, 12 Drawing Sheets

HERMAPHRODITIC ADVANCING ELECTRICAL CONNECTOR

CROSS REFERENCE TO RELATED APPLICATIONS

This application claims benefit to U.S. Provisional Application No. 63/308,098, filed 9 Feb. 2022, titled "HERMAPHRODITIC ADVANCING ELECTRICAL CONNECTOR", the subject matter of which is herein incorporated by reference in its entirety.

BACKGROUND OF THE INVENTION

The subject matter herein relates generally to electrical connectors.

Electrical connectors are used to electrically connect various electrical devices, such as to transmit power and/or data between the electrical devices. In various embodiments, the electrical connectors may be used in an autonomous mobile robot (AMR), such as to connect the AMR to a docking station. The electrical connectors are designed to have complimentary interfaces to allow mating when the AMR returns to the docking station. Each connector is designed and manufactured independently adding cost to the overall system. Additionally, alignment of the electrical connectors may be difficult to achieve. Additionally, the contacts of the electrical connectors may be subject to damage or contamination as the AMR moves throughout the facility before returning to the docking station.

BRIEF DESCRIPTION OF THE INVENTION

In one embodiment, an electrical connector is provided and includes a housing having a housing mating end at a front of the housing. The housing mating end includes a hermaphroditic mating interface configured to be mated with a mating electrical connector having an identical mating interface. The housing has a contact cavity. The housing has a contact shroud at the housing mating end. The contact shroud includes openings at the front. The electrical connector includes a contact assembly received in the contact cavity. The contact assembly includes a contact holder holding contacts. The contacts include mating ends aligned with corresponding openings of the contact shroud. The mating ends defines a hermaphroditic contact interface for mating with mating contacts of the mating electrical connector has an identical contact interface. The electrical connector includes a retractable cover coupled to the housing. The retractable cover is located at the contact shroud to close the openings. The retractable cover is movable relative to the housing between a closed position and an open position. The electrical connector includes a cover actuator coupled to the housing. The cover actuator includes a pusher and an actuation element. The actuation element is operably coupled to the retractable cover to move the retractable cover from the closed position to the open position. The pusher is configured to interface with a complimentary actuation element of the mating electrical connector to actuate a retractable cover of the mating electrical connector.

In another embodiment, an electrical connector is provided and includes a housing having a housing mating end at a front of the housing. The housing mating end includes a hermaphroditic mating interface configured to be mated with a mating electrical connector has an identical mating interface. The housing having a contact cavity. The housing has a contact shroud at the housing mating end. The housing includes a guide socket at a first side of the contact shroud and a guide pin at a second side of the contact shroud. The guide socket is configured to receive a mating guide pin of the mating electrical connector. The guide pin is configured to be plugged into a mating guide socket of the mating electrical connector. The electrical connector includes a contact assembly received in the contact cavity. The contact assembly is movable relative to the housing from a retracted position to an advanced position. The contact assembly includes a contact holder holding contacts. The contacts include mating ends defining a hermaphroditic contact interface for mating with mating contacts of the mating electrical connector has an identical contact interface. The electrical connector includes a contact assembly actuator coupled to the housing. The contact assembly actuator includes a contact assembly actuation element operably coupled to the contact assembly to move the contact assembly from the retracted position to the advanced position. The contact assembly actuation element is actuated by the mating guide pin of the mating electrical connector as the electrical connector is mated to the mating electrical connector to move the contacts of the contact assembly toward the mating electrical connector for mating the contacts with the mating contacts of the mating electrical connector.

In a further embodiment, an electrical connector system is provided and includes a first electrical connector having a first housing, a first contact assembly, a first retractable cover, a first cover actuator, and a first contact assembly actuator. The first housing includes a first hermaphroditic mating interface at a front of the first housing. The first housing having a first contact cavity and a first contact shroud at the front with first openings providing access to the first contact cavity. The first housing includes a first guide socket and a first guide pin at the front of the first housing. The first contact assembly is received in the first contact cavity and movable relative to the first housing from a retracted position to an advanced position. The first contact assembly includes a first contact holder holding first contacts including first mating ends defining a first hermaphroditic contact interface. The first retractable cover is coupled to the first housing at the first contact shroud to close the first openings. The first retractable cover is movable relative to the first housing between a closed position and an open position. The first cover actuator includes a first pusher and a first actuation element operably coupled to the first retractable cover to move the first retractable cover from the closed position to the open position. The first contact assembly actuator includes a first contact assembly actuation element operably coupled to the first contact assembly to move the first contact assembly from the retracted position to the advanced position. The electrical connector system includes a second electrical connector having a second housing, a second contact assembly, a second retractable cover, a second cover actuator, and a second contact assembly actuator. The second housing includes a second hermaphroditic mating interface at a front of the second housing identical to the first hermaphroditic mating interface. The second housing has a second contact cavity and a second contact shroud at the front with second openings providing access to the second contact cavity. The second housing includes a second guide socket and a second guide pin at the front of the second housing. The second contact assembly being received in the second contact cavity and movable relative to the second housing from a retracted position to an advanced position. The second contact assembly includes a second contact holder holding second contacts including second mating ends defining a second hermaphroditic contact interface identical to the first hermaphroditic contact interface. The second retractable cover is coupled to the second housing at the second contact shroud to close the second openings. The second retractable cover is movable relative to the second housing between a closed position and an open position. The second cover actuator includes a second pusher and a second actuation element operably coupled to the second retractable cover to move the second retractable cover from the closed position to the open position. The second contact assembly actuator includes a second contact assembly actuation element operably coupled to the second contact assembly to move the second contact assembly from the retracted position to the advanced position. The first pusher actuates the second actuation element when the first and second electrical connectors are mated to open the second retractable cover and the second pusher actuates the first actuation element when the first and second electrical connectors are mated to open the first retractable cover. The first guide pin actuates the second contact assembly actuation element when the first and second electrical connectors are mated to move the second contact assembly to the advanced position and the second guide pin actuates the first contact assembly actuation element when the first and second electrical connectors are mated to move the first contact assembly to the advanced position. The first and second contacts are mated when the first and second contact assemblies are moved to the advanced positions.

DETAILED DESCRIPTION OF THE INVENTION

Figure 1:
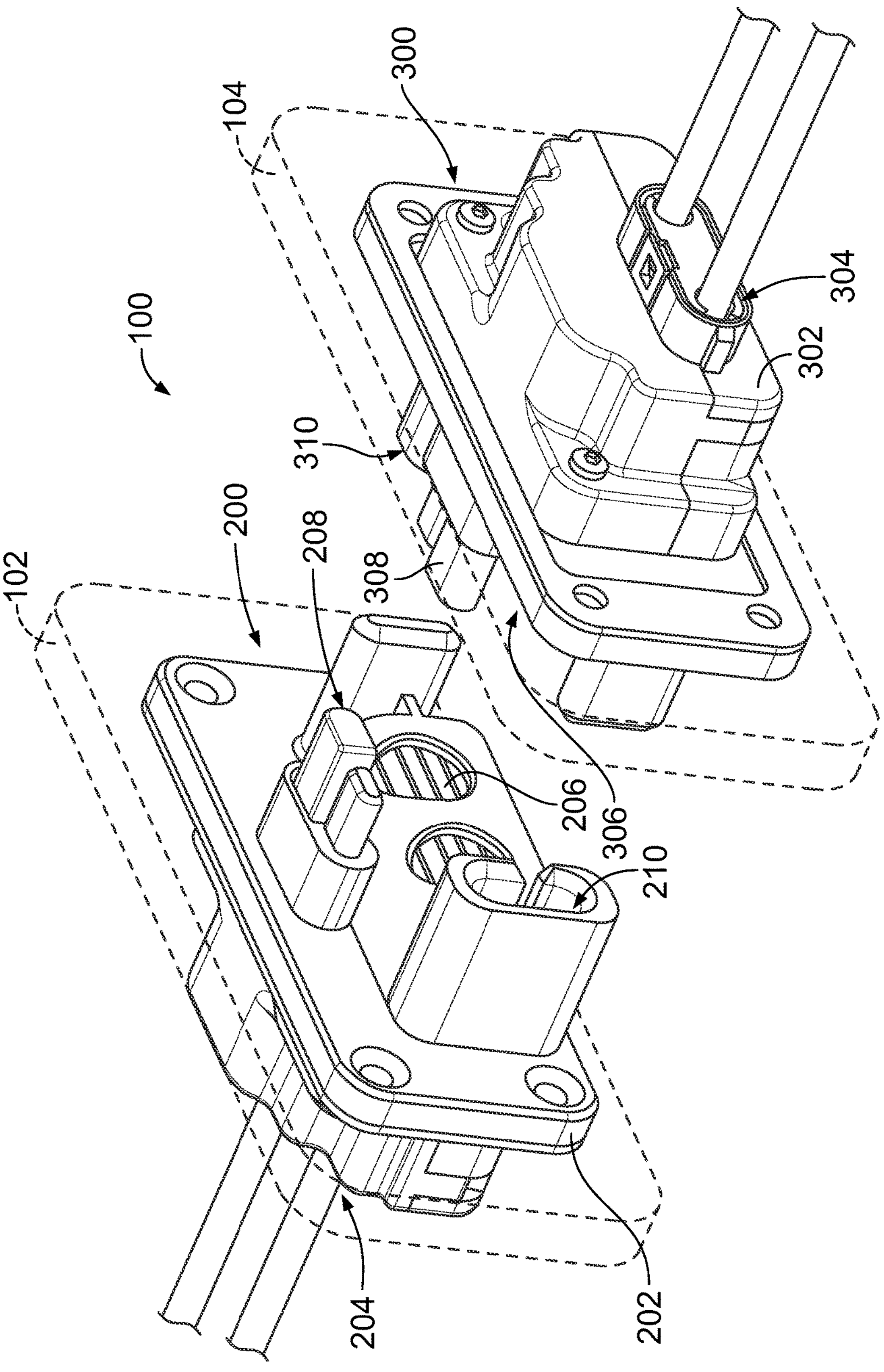
FIG. 1 illustrates an electrical connector system in accordance with an exemplary embodiment.

FIG. 1 illustrates an electrical connector system 100 in accordance with an exemplary embodiment. The electrical connector system 100 includes a first electrical connector 200 and a second electrical connector 300. The first and second electrical connectors 200, 300 are hermaphroditic electrical connectors. For example, the first and second electrical connectors 200, 300 are identical to each other and have hermaphroditic mating interfaces that allow mating of the electrical connectors 200, 300 to themselves.

The first electrical connector 200 is configured to be mounted to a first electrical device 102 and the second electrical connector 300 is configured to be mounted to a second electrical device 104. The first and second electrical connectors 200, 300 are configured to be mated to electrically connect the first and second electrical devices 102, 104. In various embodiments, the first electrical device 102 is an autonomous mobile robot (AMR) and the second electrical device 104 is a docking station for the AMR. The first and second electrical connectors 200, 300 are mated to charge the AMR when the AMR is docked at the docking station. The first and second electrical connectors 200, 300 may be used with other types of electrical devices in alternative embodiments.

In an exemplary embodiment, the electrical connectors 200, 300 have covered mating interfaces. For example, the mating interfaces are covered when the first and second electrical connectors 200, 300 are unmated. For example, when the AMR is moved around the facility, the mating interface is covered. The mating interfaces may be uncovered during mating to allow electrical connection of the electrical connectors 200, 300. For example, covers may be opened to expose the contacts of the electrical connectors 200, 300 during mating. The covers may be automatically opened during the mating process. For example, actuators may be used to open the covers as the first and second electrical devices 102, 104 are mated. In various embodiments, the actuators may be mechanical actuators. In other various embodiments, the actuators may be electrical actuators, such as solenoids used to open and close the covers. In various embodiments, the sealed interfaces may be provided around the electrical connectors 200, 302 provide sealed interfaces.

In an exemplary embodiment, the electrical connectors 200, 300 include mechanisms for advancing the contacts in forward mating directions during the mating process. The contacts may be retracted when unmated, such as to allow the contacts to be covered by the covers. However, when mated and when the covers or opened, the contacts may be advanced toward each other to allow mating of the contacts. In various embodiments, the contacts are automatically advanced during the mating process. For example, actuators may be used to move the contacts in forward mating directions as the first and second electrical devices 102, 104 are mated. The actuators may be mechanical actuators. In other various embodiments, the actuators may be electrical actuators, such as solenoids used to electrically advanced the contacts.

In an exemplary embodiment, the first electrical connector 200 includes a first housing 202, a first contact assembly 204, a first retractable cover 206, a first cover actuator 208, and a first contact assembly actuator 210. The first contact assembly 204 is received in the first housing 202. The first retractable cover 206 covers the first contact assembly 204 from the external environment, such as to prevent contamination of the mating interface of the first contact assembly 204 by debris, moisture, or other contaminants and/or to prevent damage to the first contact assembly 204. The first cover actuator 208 is used to open and close the first retractable cover 206. The first cover actuator 208 is configured to be engaged by the second electrical connector 300 during mating to actuate the first cover actuator 208 and open the first retractable cover 206. The first contact assembly actuator 210 is used to advance the first contact assembly 204 to an advanced position during mating with the second electrical connector 300. In an exemplary embodiment, the first contact assembly actuator 210 is configured to be engaged by the second electrical connector 300 during mating to actuate the first contact assembly actuator 210 and advance the contact assembly 204.

In an exemplary embodiment, the second electrical connector 300 includes a second housing 302, a second contact assembly 304, a second retractable cover 306, a second cover actuator 308, and a second contact assembly actuator 310. The second contact assembly 304 is received in the second housing 302. The second retractable cover 306 covers the second contact assembly 304 from the external environment, such as to prevent contamination of the mating interface of the second contact assembly 304 by debris, moisture, or other contaminants and/or to prevent damage to the second contact assembly 304. The second cover actuator 308 is used to open and close the second retractable cover 306. The second cover actuator 308 is configured to be engaged by the first electrical connector 200 during mating to actuate the second cover actuator 308 and open the second retractable cover 306. The second contact assembly actuator 310 is used to advance the second contact assembly 304 to an advanced position during mating with the first electrical connector 200. In an exemplary embodiment, the second contact assembly actuator 310 is configured to be engaged by the first electrical connector 200 during mating to actuate the second contact assembly actuator 310 and advance the contact assembly 304.

In an exemplary embodiment, the first and second electrical connectors 200, 300 may have identical components. The following description may be described with reference to the first electrical connector 200. For example, the description of FIGS. 2-12 are with reference to the first electrical connector 200. However, it is realized that the second electrical connector 300 may include identical components identified with corresponding reference numerals. Reference to elements using the term "first" or with reference numerals in the 200's refer to elements of the first electrical connector 200. Reference to elements using the term "second" or with reference numerals in the 300's refer to elements of the second electrical connector 300.

Figure 2:
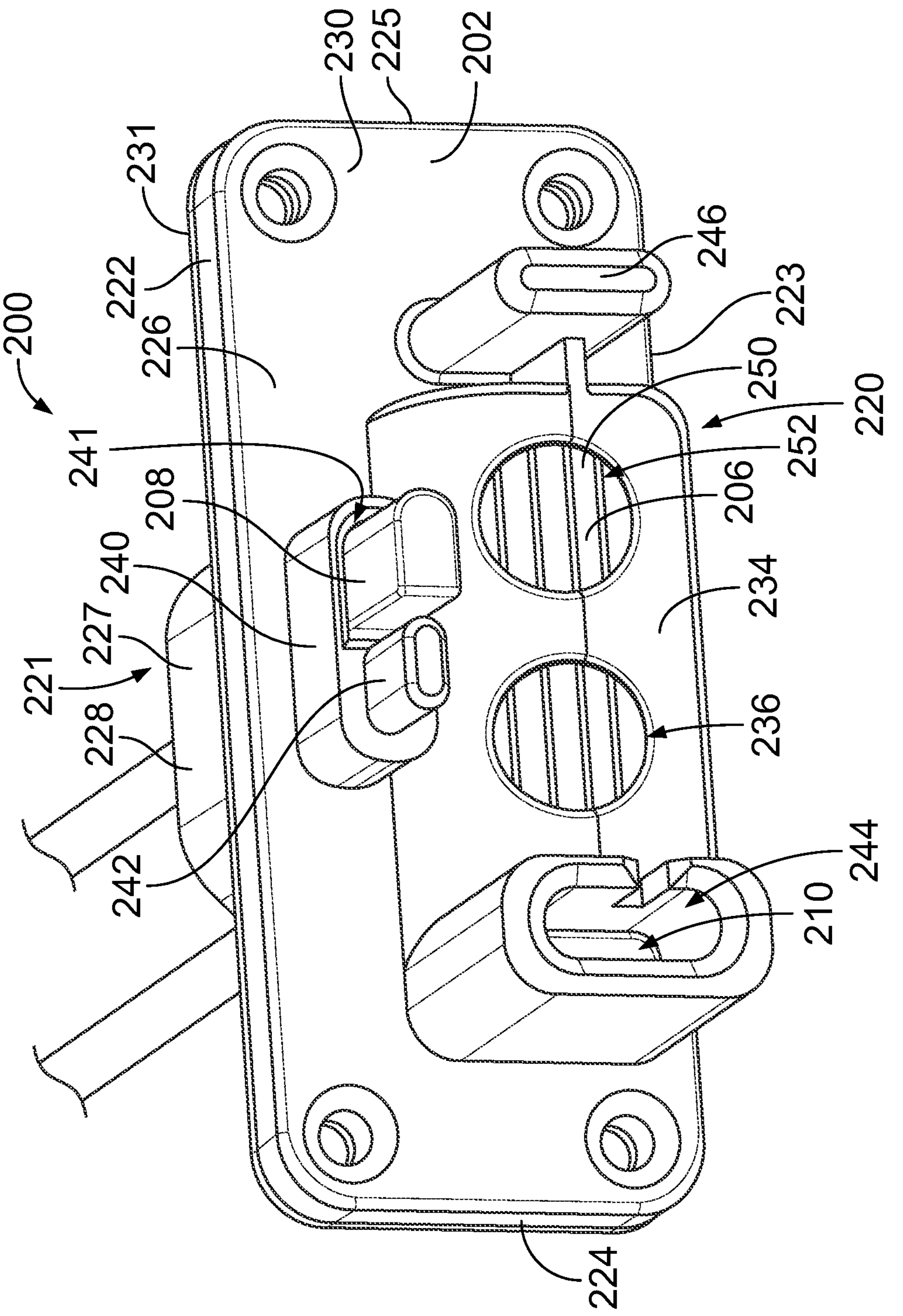
FIG. 2 is a front perspective view of the first electrical connector in accordance with an exemplary embodiment in a closed state and a retracted state.
Figure 3:
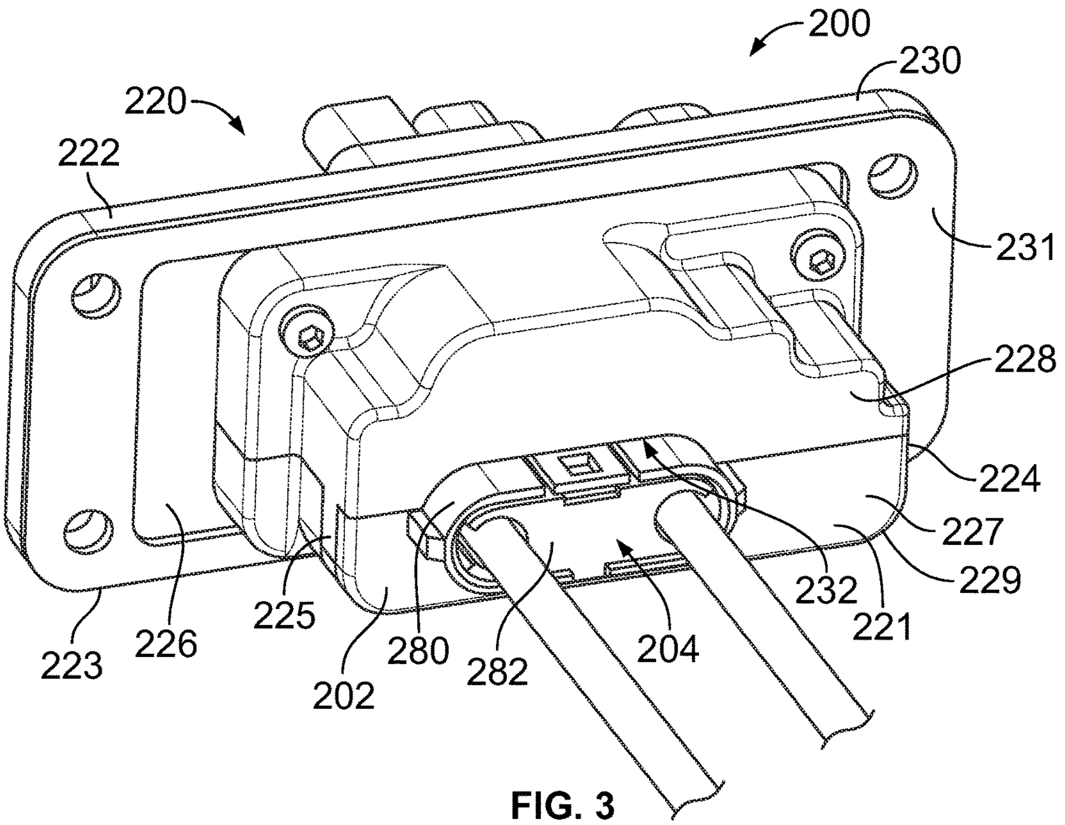
FIG. 3 is a rear perspective view of the first electrical connector in accordance with an exemplary embodiment in a closed state and a retracted state.
Figure 4:
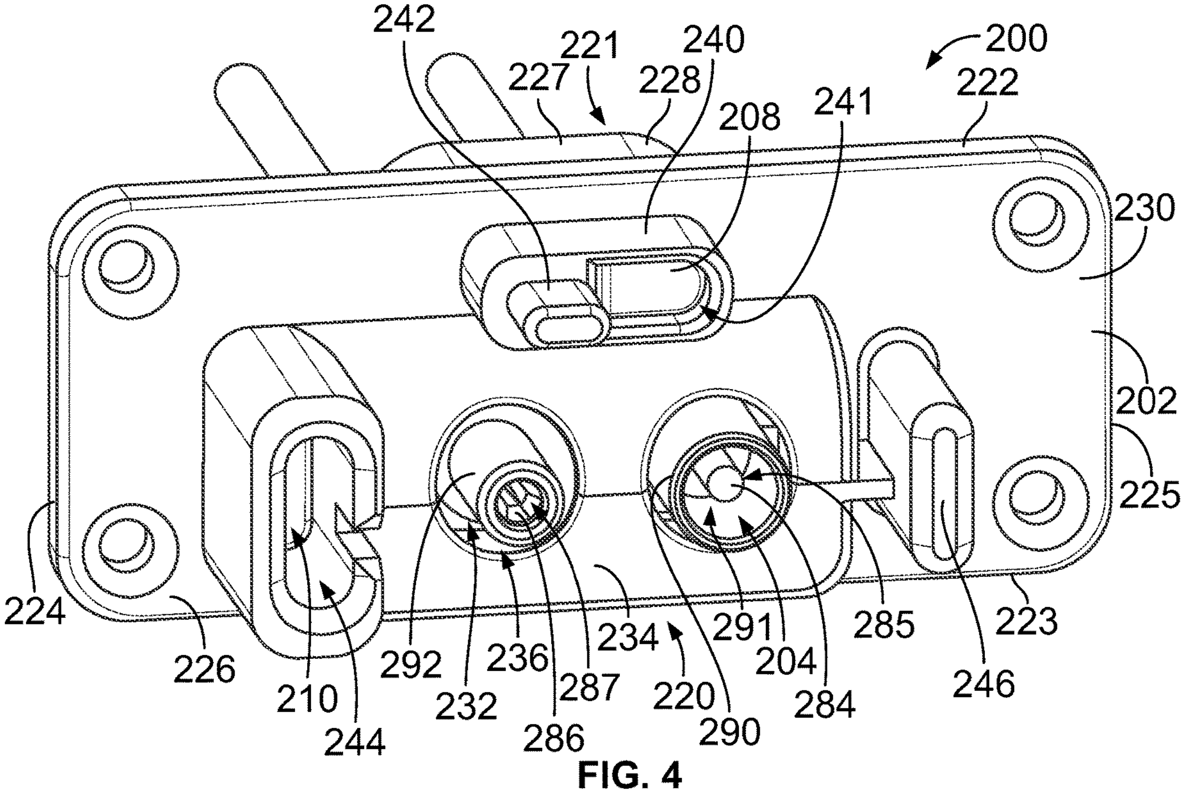
FIG. 4 is a front perspective view of the first electrical connector in accordance with an exemplary embodiment in an open state and an advanced state.
Figure 5:
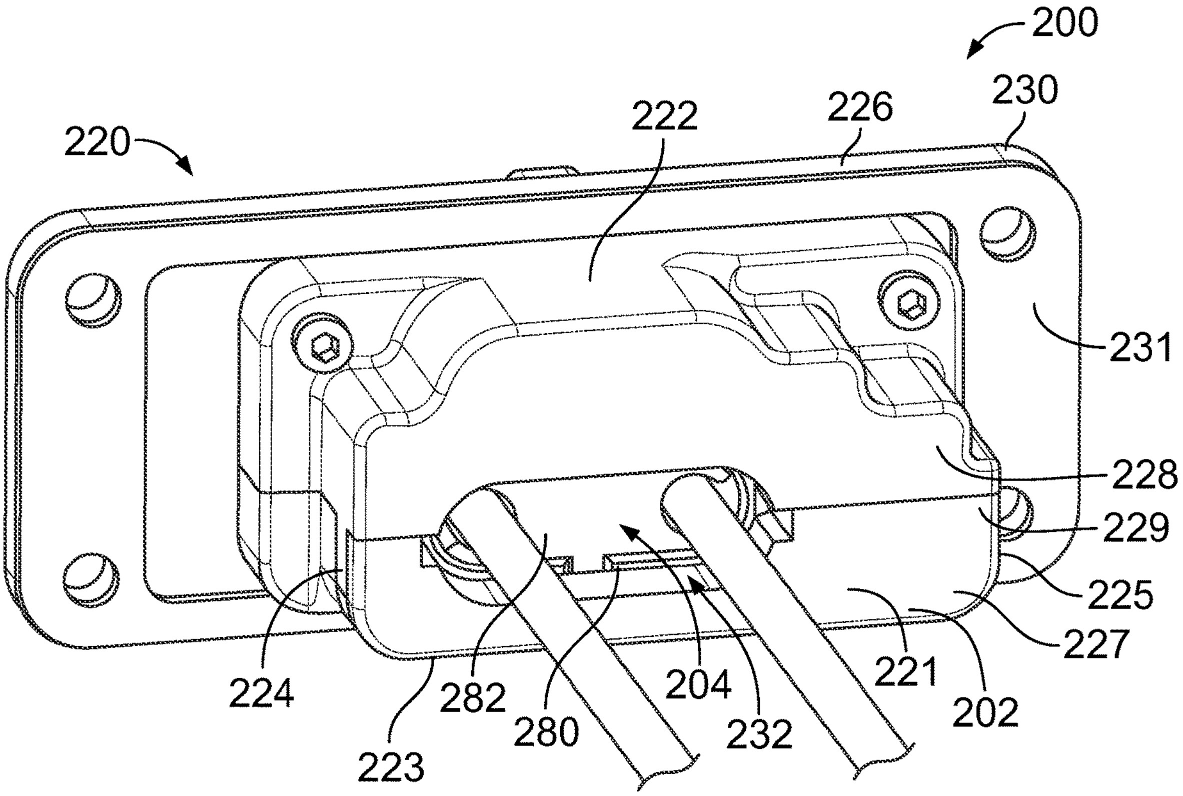
FIG. 5 is a rear perspective view of the first electrical connector in accordance with an exemplary embodiment in an open state and an advanced state.

FIG. 2 is a front perspective view of the first electrical connector 200 in accordance with an exemplary embodiment in a closed state and a retracted state. FIG. 3 is a rear perspective view of the first electrical connector 200 in accordance with an exemplary embodiment in a closed state and a retracted state. FIG. 4 is a front perspective view of the first electrical connector 200 in accordance with an exemplary embodiment in an open state and an advanced state. FIG. 5 is a rear perspective view of the first electrical connector 200 in accordance with an exemplary embodiment in an open state and an advanced state.

The electrical connector 200 includes the housing 202, the contact assembly 204, the first retractable cover 206 (FIG. 2), the first cover actuator 208, and the first contact assembly actuator 210.

The housing 202 extends between a front 220 and a rear 221. The housing 202 includes a top 222 and a bottom 223. The housing 202 includes a first side 224 and a second side 225. The front 220 defines a mating end of the housing 202 configured to be mated with the second electrical connector 300.

In an exemplary embodiment, the housing 202 is a multipiece housing. For example, the housing 202 includes a front housing 226 and a rear housing 227. The rear housing 227 is separate and discrete from the front housing 226 and is configured to be coupled to the front housing 226, such as using fasteners. In the illustrated embodiment, the rear housing 227 is a multipiece component including an upper shell 228 and a lower shell 229. The upper and lower shells 228, 229 may be clipped or latched together. In other various embodiments, the upper and lower shells 228, 229 may be secured together using fasteners, such as threaded screws.

In an exemplary embodiment, the housing 202 includes a flange 230, which may be used for mounting the housing 202 to another structure, such as a structure of the first electrical device 102 (shown in FIG. 1). The flange 230 includes mounting openings configured to receive fasteners to secure the housing 202 to the first electrical device 102. In the illustrated embodiment, the flange 230 is part of the front housing 226. The rear housing 227 may be mounted to the rear surface of the flange 230. In an exemplary embodiment, a gasket 231 is coupled to the rear side of the flange 230. The gasket 231 may be provided between the flange 230 and the first electrical device 102. The gasket 231 may be manufactured from a rubber material or other material that may provide sealing between the housing 202 and the first electrical device 102.

In an exemplary embodiment, the housing 202 includes a contact cavity 232 that receives the contact assembly 204. Optionally, the contact cavity 232 may be open at the rear 221 to receive the contact assembly 204. In various embodiments, the contact assembly 204 may extend from the rear 221 of the housing 202. In an exemplary embodiment, the contact assembly 204 is movable relative to the housing 202. For example, the contact assembly 204 may be movable within the contact cavity 232. The contact assembly 204 may be moved between a retracted position (FIGS. 2 and 3) and an advanced position (FIGS. 4 and 5). In various embodiments, the contact assembly 204 is normally held in the retracted position; however, the contact assembly 204 may be moved to the advanced position by the contact assembly actuator 210, such as during mating with the second electrical connector 300.

In an exemplary embodiment, the housing 202 includes a contact shroud 234 at the front 220. The contact shroud 234 is provided at the front end of the contact cavity 232. The contact shroud 234 generally closes the contact cavity 232 at the front 220 of the housing 202. The contact shroud 234 extends forward of the flange 230. However, in alternative embodiments, the housing 202 may be provided without the contact shroud 234 or the contact shroud 234 may be located rearward of the flange 230 such that the flange 230 defines the front of the housing 202. In an exemplary embodiment, the contact shroud 234 includes openings 236 configured to provide access to the contact assembly 204. In an exemplary embodiment, the retractable cover 206 closes the openings 236. However, the retractable cover 206 may be opened to open the openings 236 and provide access to the contact assembly 204. In an exemplary embodiment, the openings 236 are provided on opposite sides of a central mating plane of the electrical connector 200. The openings 236 may be equally spaced apart from the central mating plane, such as for proper mating with the hermaphroditic second electrical connector 300.

In an exemplary embodiment, the housing 202 includes a protrusion 240 above the contact shroud 234. A pusher 242 extend forward of the protrusion 240. The cover actuator 208 extends from the protrusion 240. In an exemplary embodiment, the pusher 242 and the cover actuator 208 are located adjacent each other on opposite sides of the central mating plane, such as for proper mating with the hermaphroditic second electrical connector 300. The cover actuator 208 extends into an opening 241 in the protrusion 240 into the interior of the housing 202. For example, the cover actuator 208 may be coupled to the retractable cover 206 within the interior of the housing 202. The pusher 242 is configured to interface with the second cover actuator 308 (shown in FIG. 1) of the second electrical connector 300 to actuate the second cover actuator 308 and opened the second retractable cover 306. The pusher 242 and the cover actuator 208 may be located at other locations along the mating end of the housing 202 in alternative embodiments, such as flanking opposite sides of the contact shroud 234 or located below the contact shroud 234.

In an exemplary embodiment, the housing 202 includes a guide socket 244 at a first side of the contact shroud 234 and a guide pin 246 and a second side of the contact shroud 234. The guide socket 244 includes an opening or receptacle configured to receive the complementary second guide pin of the second electrical connector 300. The guide socket 244 and the guide pin 246 are used to guide mating of the electrical connector 200 with the second electrical connector 300. In an exemplary embodiment, the distal ends of the guide socket 244 and the guide pin 246 are located forward of the contact shroud 234, such as for mating with the second electrical connector 300 prior to any of a portion of the first electrical connector 200 to guide mating. In the illustrated embodiment, the guide socket 244 and the guide pin 246 are oval-shaped. However, the guide socket 244 and the guide pin 246 may have other shapes in alternative embodiments, such as being cylindrical. In an exemplary embodiment, the contact assembly actuator 210 is located within the receptacle of the guide socket 244 and is configured to be actuated by the second guide pin of the second electrical connector 300 during mating.

The retractable cover 206 is operably coupled to the cover actuator 208. As the cover actuator 208 is pressed inward, the retractable cover 206 may be moved from a closed position (FIG. 2) to an open position (FIG. 4). In various embodiments, the retractable cover 206 is lifted upward from the closed position to the open position as the cover actuator 208 is actuated in a rearward actuation direction. In an exemplary embodiment, the retractable cover 206 includes a plurality of cover sections 250 hingedly connected together by hinges 252. The hinges 252 may be living hinges. For example, the retractable cover 206 may be a single piece cover with the cover sections 250 integral with the hinges 252. The hinges 252 may be defined by thinner areas of the retractable cover 206 that allow relative movement between the cover sections 250. The hinges 252 allow the retractable cover 206 to move along an arcuate path. For example, the opening path of the retractable cover 206 may include a vertical section and a horizontal section with a transition section therebetween. The retractable cover 206 may open similar to a garage door or rolltop desk. However, the retractable cover 206 may include a single, planar wall in alternative embodiments that may be opened and closed, such as by translating in a linear direction (for example, vertically or at a 45° angle relative to the front) or rotating between open and closed positions.

In an exemplary embodiment, the contact assembly 204 includes a contact holder 280, a contact carrier 282 received in the contact holder 280, and a plurality of contacts, such as a first contact 284 and a second contact 286. The contact assembly 204 may include greater or fewer contacts in alternative embodiments. In the illustrated embodiment, the first contact 284 includes a pin at a first mating end 285 of the first contact 284 and the second contact 286 includes a socket at a second mating end 287 of the second contact 286. The pin and socket of the contacts 284, 286 are configured to be mated with corresponding into the sockets of the contacts of the second electrical connector 300 defined by the hermaphroditic mating interfaces of the first and second electrical connectors 200, 300.

The contact carrier 282 holds the first and second contacts 284, 286 relative to each other. In an exemplary embodiment, the contact carrier 282 is removable from the contact holder 280, such as to repair or replace the contacts 284, 286. The contact holder 280 is received in the contact cavity 232. The contact holder 280 is movable within the contact cavity 232, such as in a forward direction and a rearward direction between the retracted position (FIGS. 2 and 3) and the advanced position (FIGS. 4 and 5). In the retracted position, the contact holder 280 is confined within the contact cavity 232, such as behind the contact shroud 234 and behind the retractable cover 206. In the advanced position, portions of the contact holder 280 and the contacts 284, 286 are advanced in the forward advancing direction and exposed forward of the contact shroud 234 for mating with the second electrical connector 300. As such, the contacts 284, 286 may be protected and covered by the housing 202 and the retractable cover 206 in the retracted position, but may be exposed for mating with the second electrical connector 300 in the advanced position. The contacts 284, 286 are moved to the advanced position during the mating process with the second electrical connector 300 and are thus only exposed when mated.

In an exemplary embodiment, the contact holder 280 includes a first silo 290 at the front end of the contact holder 280 that covers the first contact 284 and a second silo 292 at the front end of the contact holder 280 that covers the second contact 286 the silos 290, 292 protect the contacts 284, 286. In the illustrated embodiment, the first silo 290 includes a receptacle surrounding the first contact 284. The receptacle 291 is configured to receive the corresponding second silo of the second electrical connector 300. In the illustrated embodiment, the contact holder 280 is oval-shaped. However, the contact holder 280 may have other shapes in alternative embodiments. In the illustrated embodiment, a single contact carrier 282 is provided. However, multiple contact carriers 282 may be received in the contact holder 280 in alternative embodiments.

Figure 6:
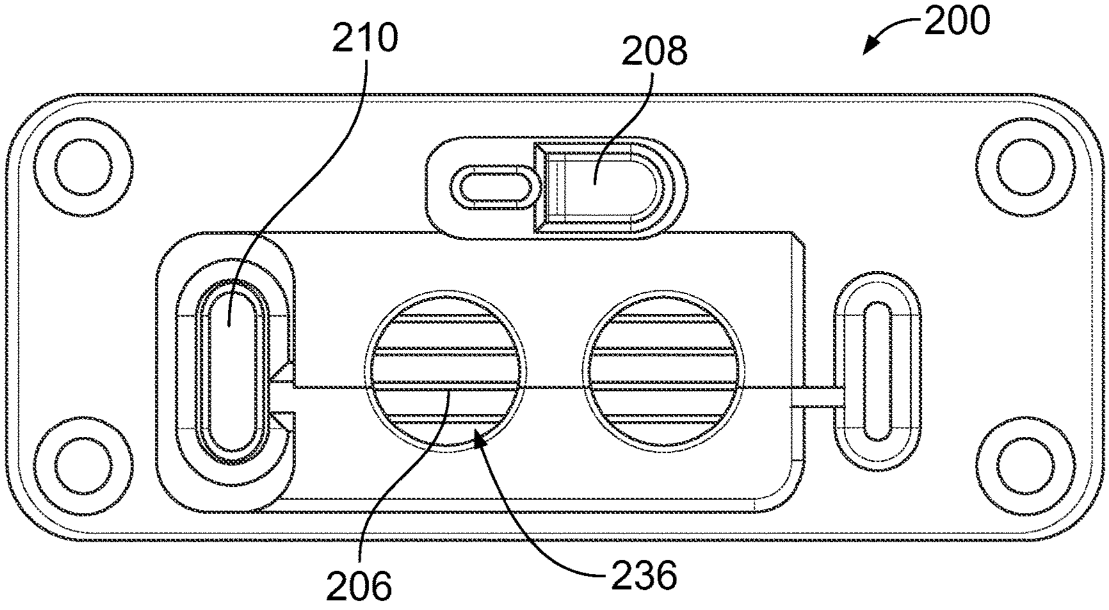
FIG. 6 is a front view of the first electrical connector in accordance with an exemplary embodiment in the closed state and the retracted state.
Figure 7:
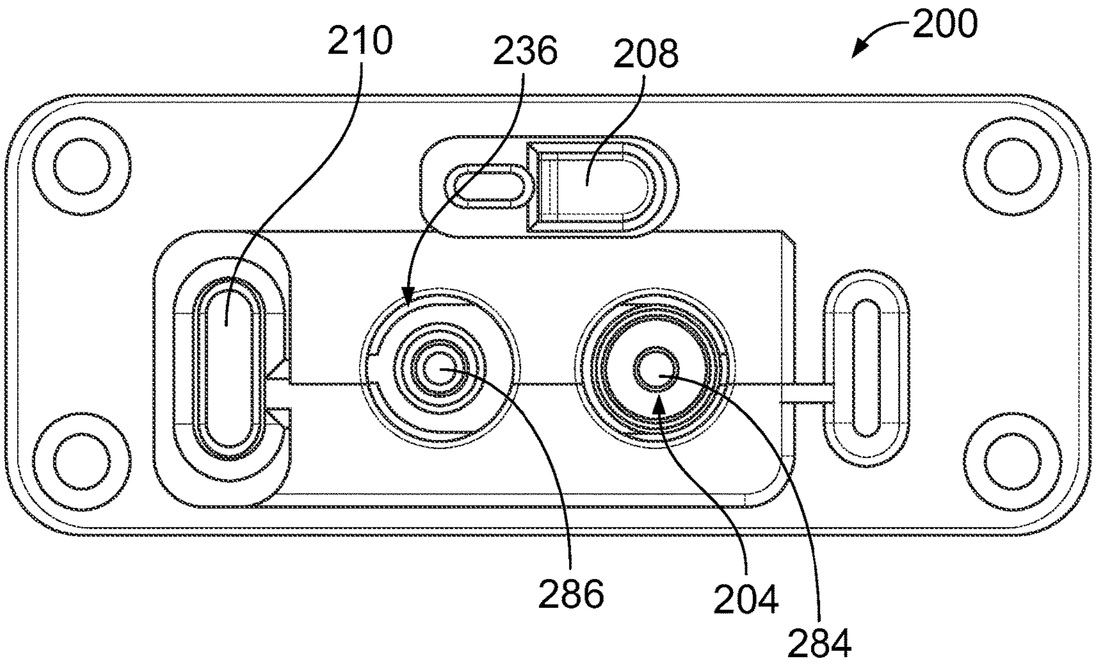
FIG. 7 is a front view of the first electrical connector in accordance with an exemplary embodiment in the open state and the advanced state.

FIG. 6 is a front view of the first electrical connector 200 in accordance with an exemplary embodiment in the closed state and the retracted state. FIG. 7 is a front view of the first electrical connector 200 in accordance with an exemplary embodiment in the open state and the advanced state. The retractable cover 206 covers and protects the contacts 284, 286 of the contact assembly 204 in the closed state. The contact assembly 204 is retracted to allow the retractable cover 206 to close the openings 236. During mating, the retractable cover 206 is opened and the contact assembly 204 is exposed through the openings 236. The contact assembly 204 may be advanced in the forward direction through the openings 236 for mating with the second electrical connector 300. The cover actuator 208 is accessible at the mating end of the electrical connector 200 to interface with the second electrical connector 300 and allow actuation thereof. The contact assembly actuator 210 is accessible at the mating end of the electrical connector 200 to interface with the second electrical connector 300 and allow actuation thereof.

Figure 8:
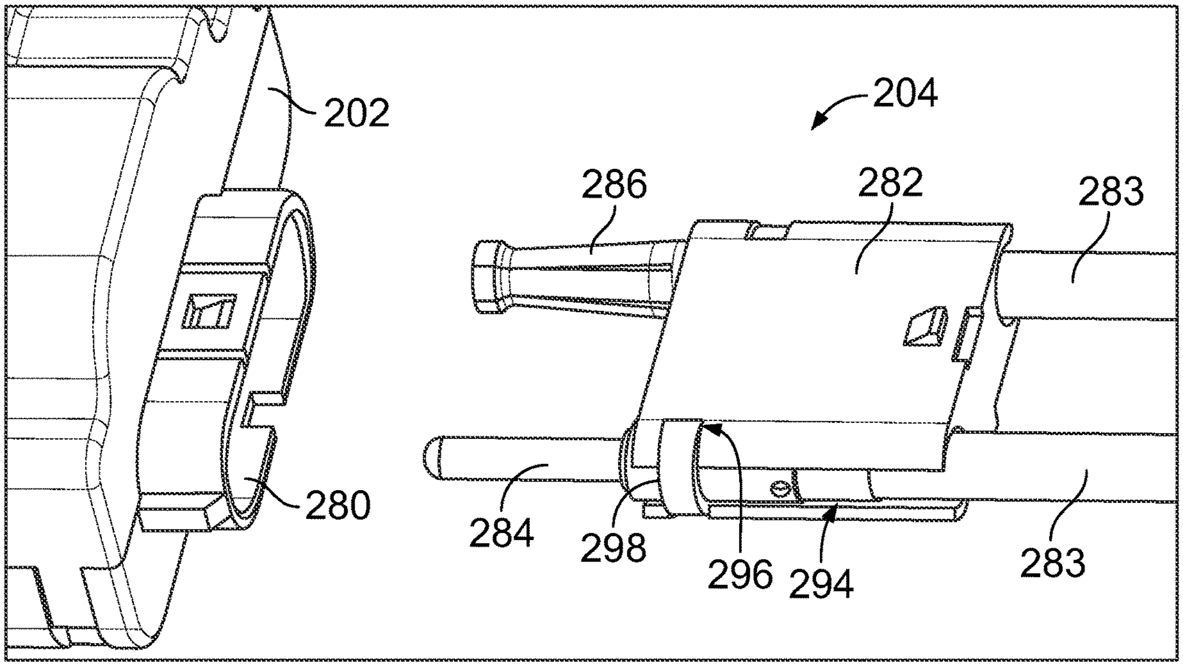
FIG. 8 is an exploded view of the contact assembly in accordance with an exemplary embodiment.

FIG. 8 is an exploded view of the contact assembly 204 in accordance with an exemplary embodiment. The contact holder 280 is shown coupled to the housing 202. The contact carrier 282 is shown poised for loading into the contact holder 280. The contacts 284, 286 are shown loaded in the contact carrier 282. In an exemplary embodiment, cables 283 are terminated to ends of the contacts 284, 286. For example, the contacts 284, 286 may be crimped to ends of the cables 283. In various embodiments, the cables 283 and the contacts 284, 286 may transmit power. Alternatively, the cables 283 and the contacts 284, 286 may transmit data signals.

In an exemplary embodiment, the contact carrier 282 includes contact channels 294 along opposite sides of the contact carrier 282. The contact channels 294 may be open along the sides of the contact carrier 282 to receive the contacts 284, 286 through the open sides. Alternatively, the contacts 284, 286 may be rear loaded into the contact channels 294. In an exemplary embodiment, the contact carrier 282 includes grooves 296 that receive flanges or shoulders 298 of the contacts 284, 286. The shoulders 298 are received in the grooves 296 two axially position the contacts 284, 286 in the contact carrier 282.

Figure 9:
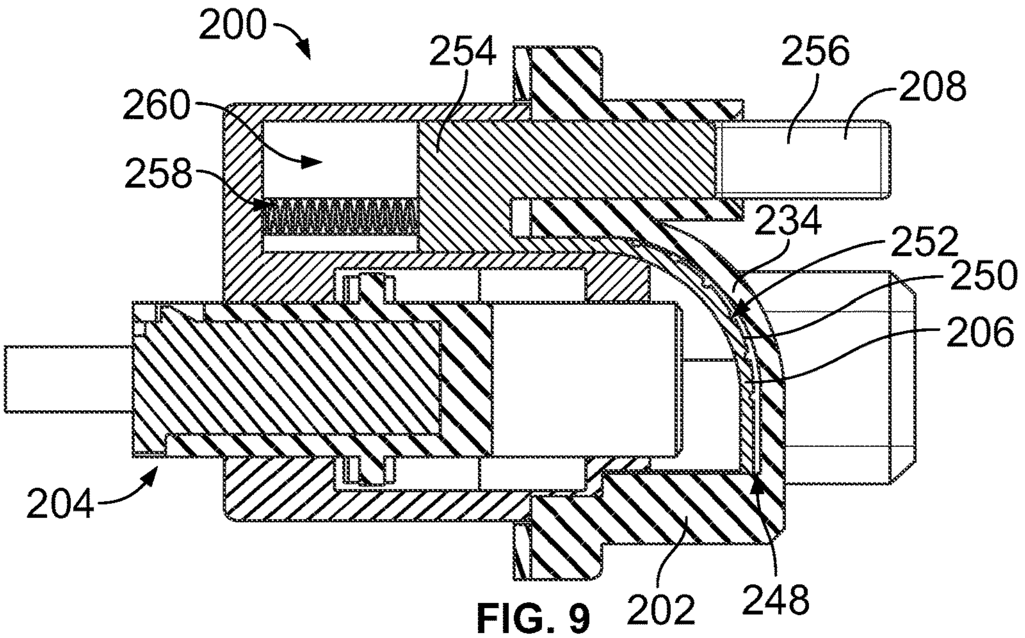
FIG. 9 is a cross-sectional view of the electrical connector in accordance with an exemplary embodiment.

FIG. 9 is a cross-sectional view of the electrical connector 200 in accordance with an exemplary embodiment. FIG. 9 illustrates the retractable cover 206 and the cover actuator 208 in accordance with an exemplary embodiment. In an exemplary embodiment, the housing 202 includes a guide track 248 that receives the retractable cover 206. The guide track 248 guides movement of the retractable cover 206 as the retractable cover 206 moves from the closed position to the open position. The guide track 248 may extend along the contact shroud 234. Optionally, the guide track may follow a curved path.

In an exemplary embodiment, the cover actuator 208 includes a main body 254 and a pushbutton 256 extending forward of the main body 254. A return spring 258 is operably coupled to the main body 254. The return spring 258 pushes forward against the main body 254 to hold the cover actuator 208 in a forward actuated position. In an exemplary embodiment, the retractable cover 206 extends from the main body 254. For example, the cover sections 250 and the hinges 252 extend from the main body 254. In an exemplary embodiment, the retractable cover 206 is integral with the cover actuator 208. For example, the retractable cover 206 is co-molded with the main body 254 and the pushbutton 256. However, in alternative embodiments, the retractable cover 206 may be separate and discrete from the cover actuator 208 and operably coupled to the cover actuator 208.

In an exemplary embodiment, the pushbutton 256 extends to the exterior of the housing 202. The pushbutton 256 is configured to be actuated by the second electrical connector 300 during mating. For example, the pushbutton 256 may be pushed rearward during mating with the second electrical connector 300. The main body 254 is located within the housing 202. For example, the main body 254 is located within a cover chamber 260 of the housing 202. The main body 254 is movable within the cover chamber 260. For example, when the pushbutton 256 is actuated and pressed rearward, the main body 254 moves rearward within the cover chamber 260. As the main body 254 moves rearward within the cover chamber 260, the retractable cover 206 is opened. For example, the retractable cover 206 may be pulled rearward, which causes the end section of the retractable cover 206 to lift upward to open the openings 236 and expose the contact assembly 204. Prior to opening of the retractable cover 206 the contact assembly 204 is retracted within the housing 202. The contact assembly 204 is located behind the retractable cover 206, rearward of the openings 236. However, after the retractable cover 206 is opened, the contact assembly 204 may be advanced in a forward direction such that a portion of the contact assembly 204 passes through the openings 236 to the exterior of the housing 202.

Figure 10:
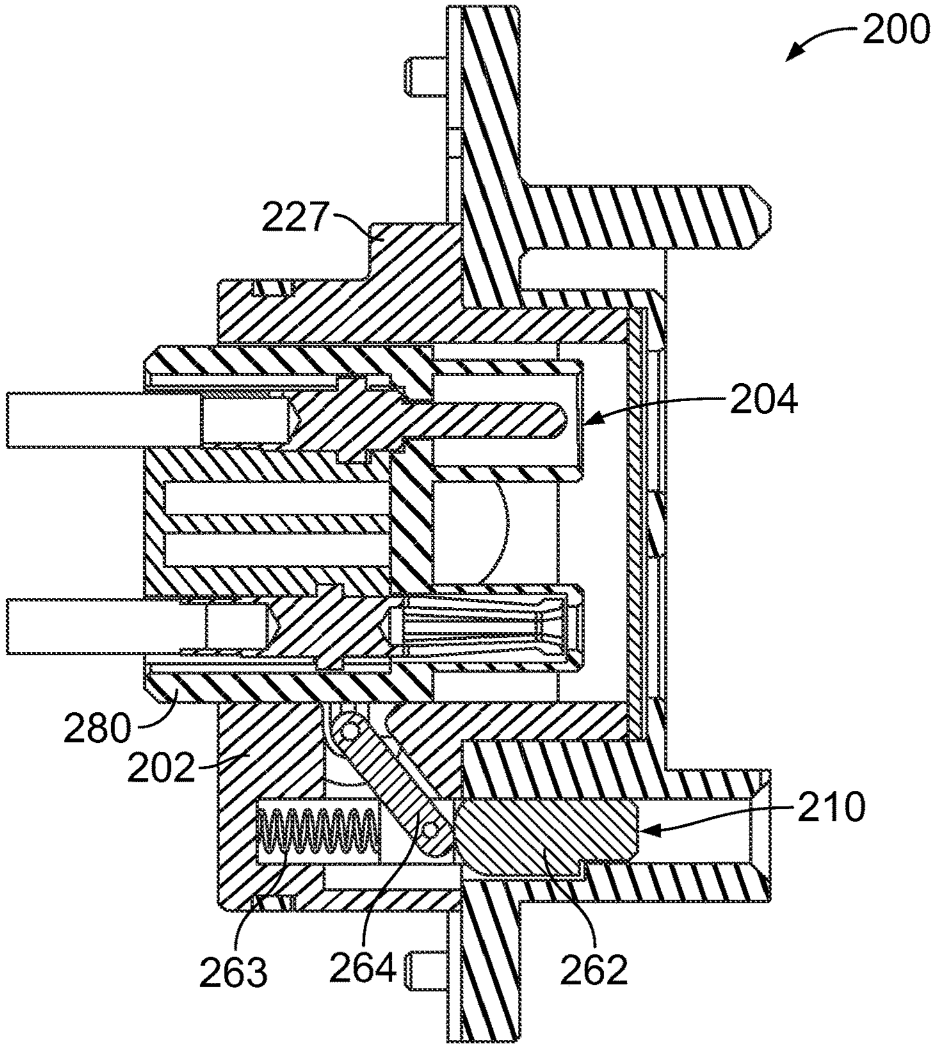
FIG. 10 is a cross-sectional view of the electrical connector in accordance with an exemplary embodiment showing the contact assembly in the retracted position.
Figure 11:
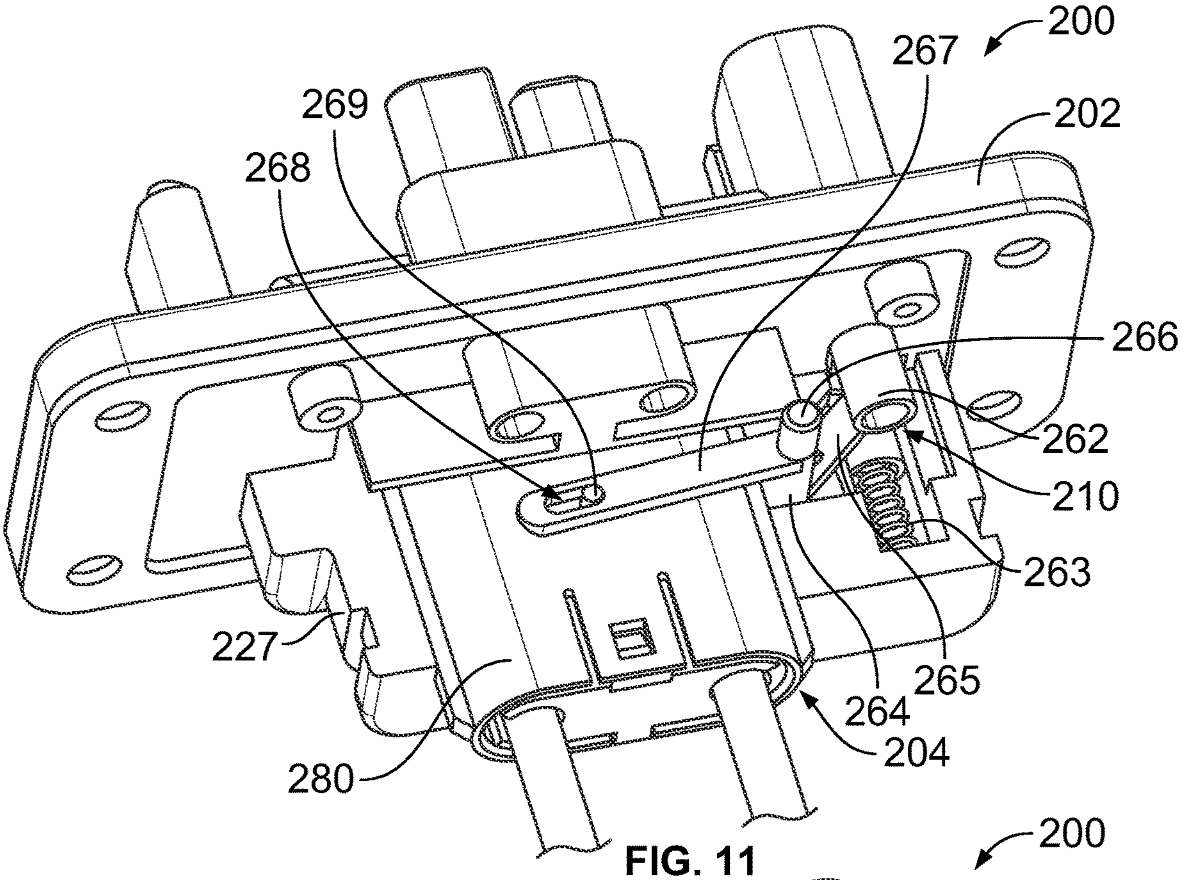
FIG. 11 is a rear perspective view of a portion of the electrical connector showing the contact assembly in the retracted position in accordance with an exemplary embodiment.
Figure 12:
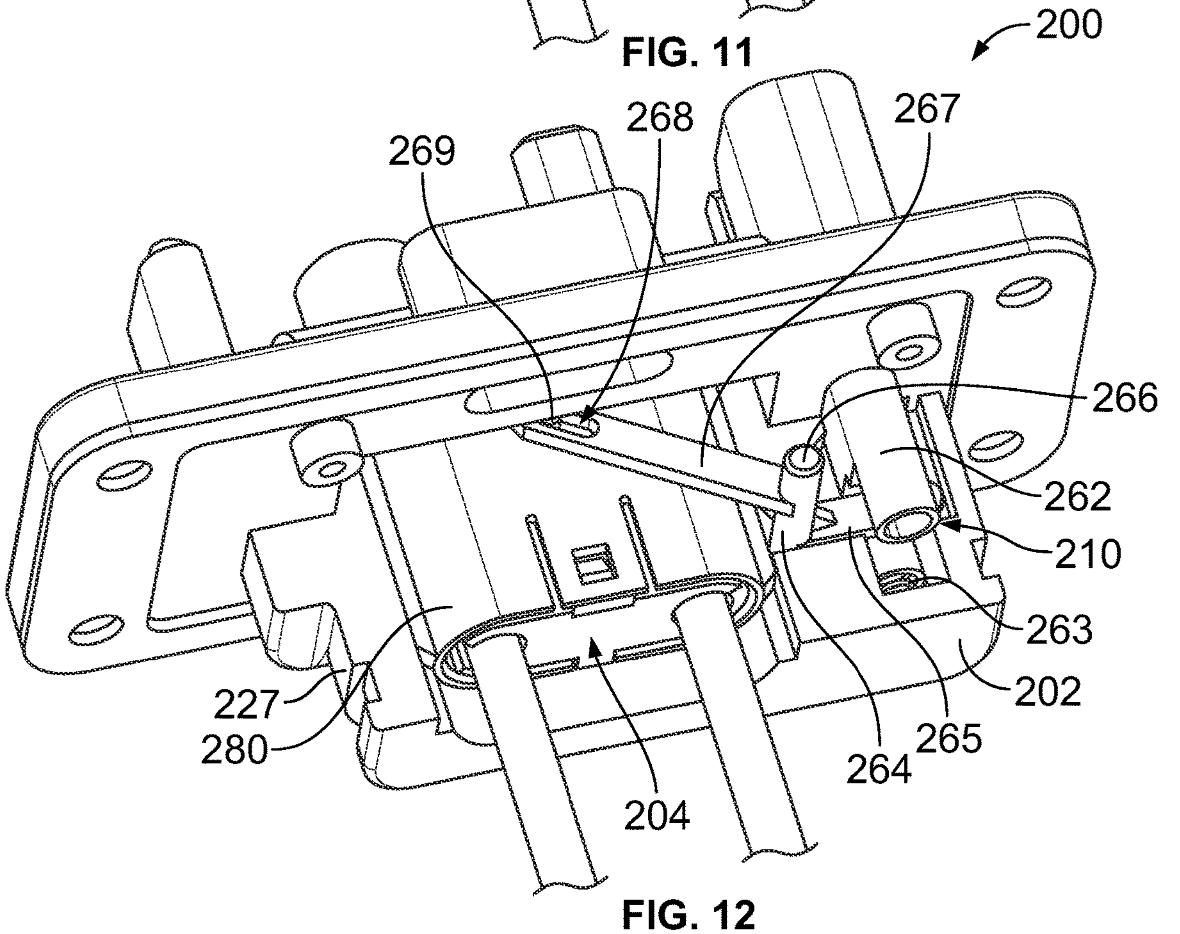
FIG. 12 is a rear perspective view of a portion of the electrical connector showing the contact assembly in the advanced position in accordance with an exemplary embodiment.

FIG. 10 is a cross-sectional view of the electrical connector 200 in accordance with an exemplary embodiment showing the contact assembly 204 in the retracted position. FIG. 11 is a rear perspective view of a portion of the electrical connector 200 showing the contact assembly 204 in the retracted position. FIG. 12 is a rear perspective view of a portion of the electrical connector 200 showing the contact assembly 204 in the advanced position. FIGS. 11 and 12 show a portion of the rear housing 227, such as the upper shell 228, removed for clarity to illustrate the contact assembly 204 and the contact assembly actuator 210.

The contact assembly actuator 210 is coupled to the housing 202 and operably coupled to the contact assembly 204 to move the contact assembly 204 between the retracted position and the advanced position. In an exemplary embodiment, the contact assembly actuator 210 includes a slide 262 and a link 264 between the slide 262 and the contact holder 280. The contact assembly actuator 210 includes a return spring 263 operably coupled to the slide 262. The return spring 263 pushes forward against the slide 262 to hold the slide 262 in a forward actuated position. The link 264 provides a mechanical linkage that converts actuation of the slide 262 and the rearward direction into forward actuation of the contact assembly 204 in the advancing direction. In an exemplary embodiment, the link 264 includes a hub 266 between a first arm 265 and a second arm 267. The hub 266 is configured to rotate within the housing 202. The first arm 265 extends from the hub 266 to the slide 262. The second arm 267 extends from the hub 266 to the contact holder 280. As the slide 262 is actuated in a rearward direction, the first arm 265 is moved rearward to rotate the hub 266. As the hub 266 rotates, the second arm 267 is moved forward causing the contact assembly 204 to move in the advancing direction. In an exemplary embodiment, the second arm 267 includes a slot 268 near a distal end of the second arm 267. A pin 269 extending from the contact holder 280 is received in the slot 268. The pin 269 is movable within the slot 268 as the contact assembly 204 is moved to the advanced position. Other types of actuators may be used in alternative embodiments to move the contact assembly 204 to the advanced position.

Figure 13:
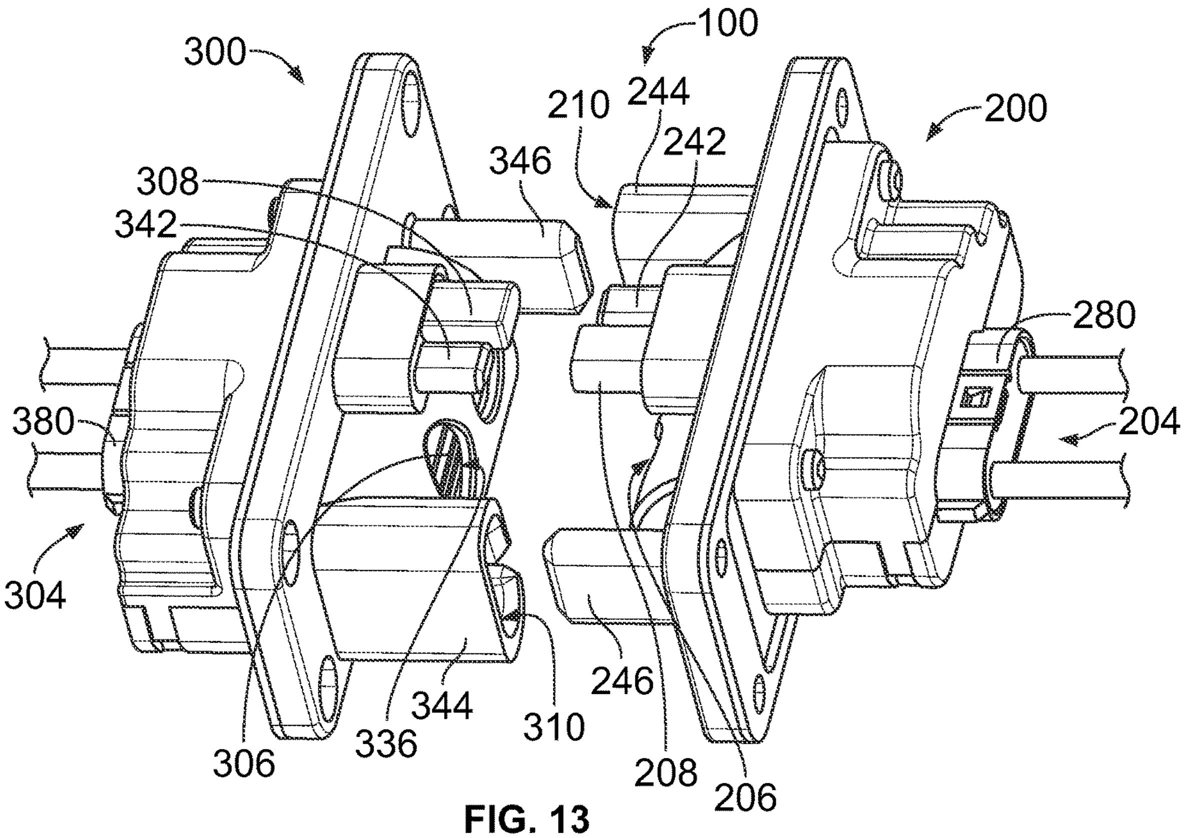
FIG. 13 illustrates an exemplary mating sequence for the first and second electrical connectors of the electrical connector system in accordance with an exemplary embodiment.
Figure 14:
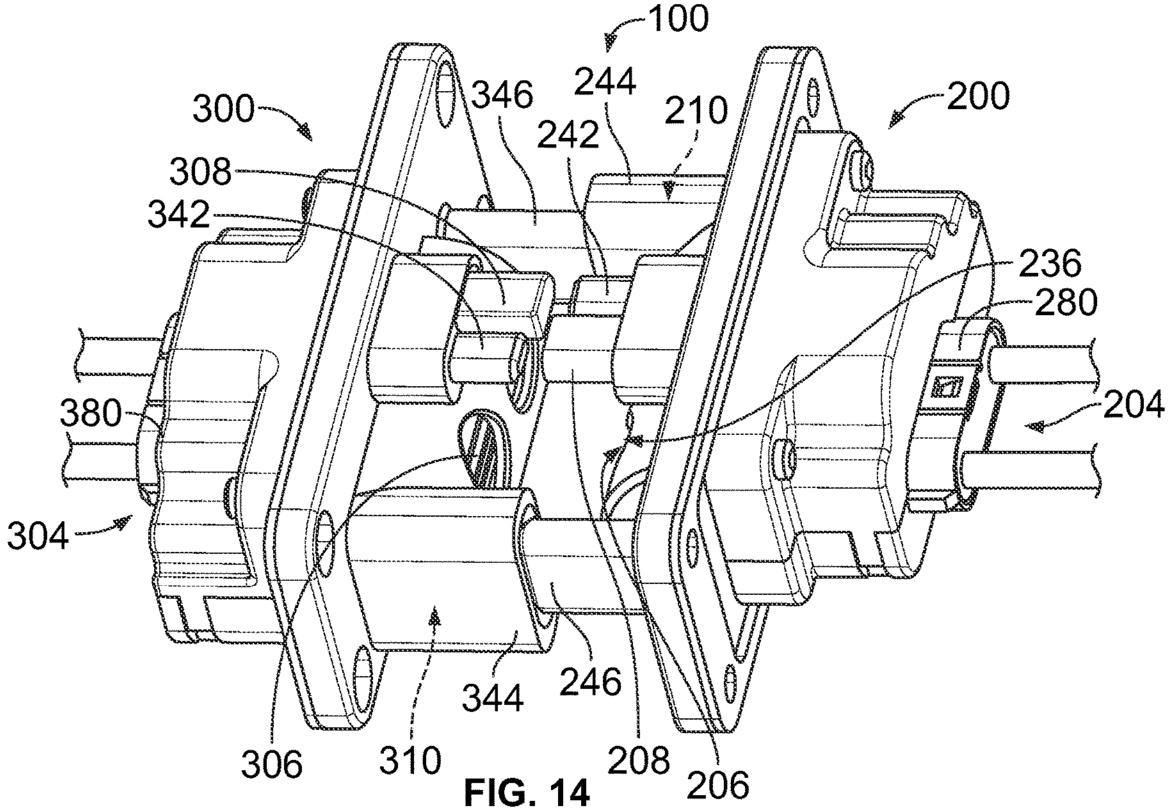
FIG. 14 illustrates an exemplary mating sequence for the first and second electrical connectors of the electrical connector system in accordance with an exemplary embodiment.
Figure 15:
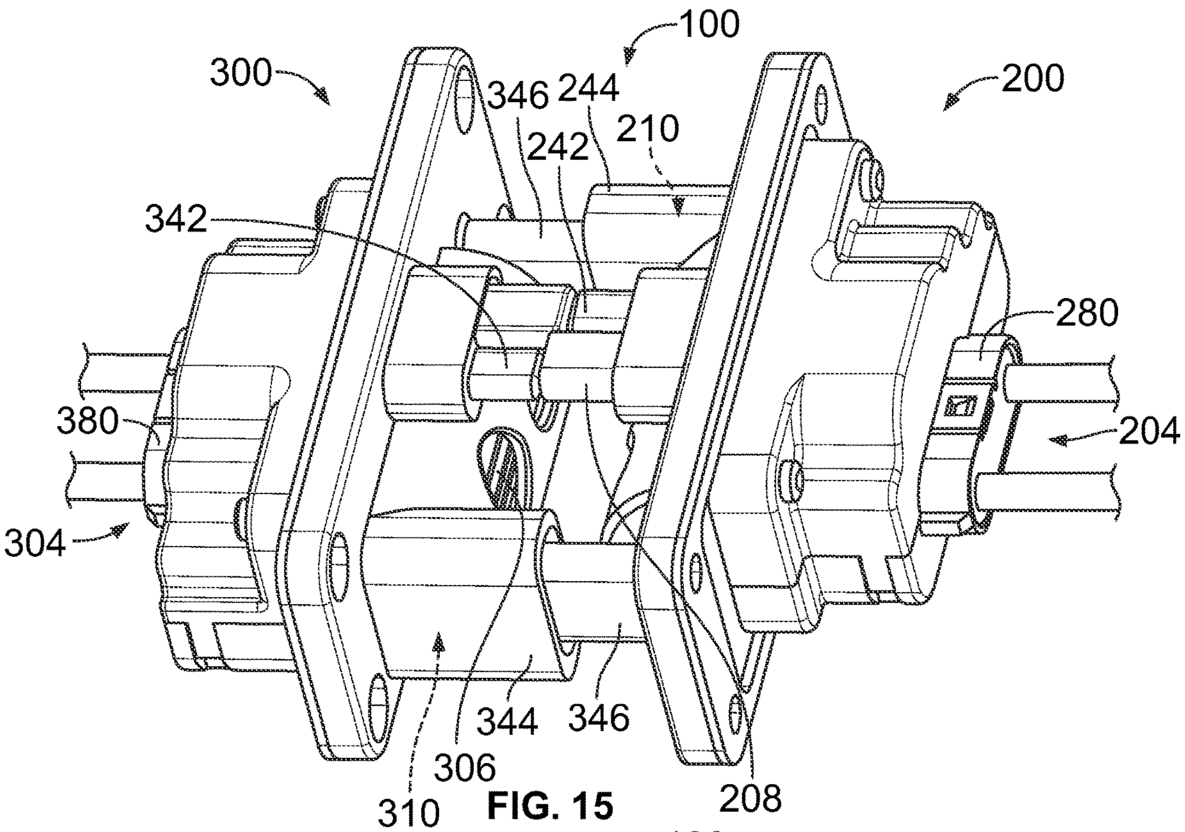
FIG. 15 illustrates an exemplary mating sequence for the first and second electrical connectors of the electrical connector system in accordance with an exemplary embodiment.
Figure 16:
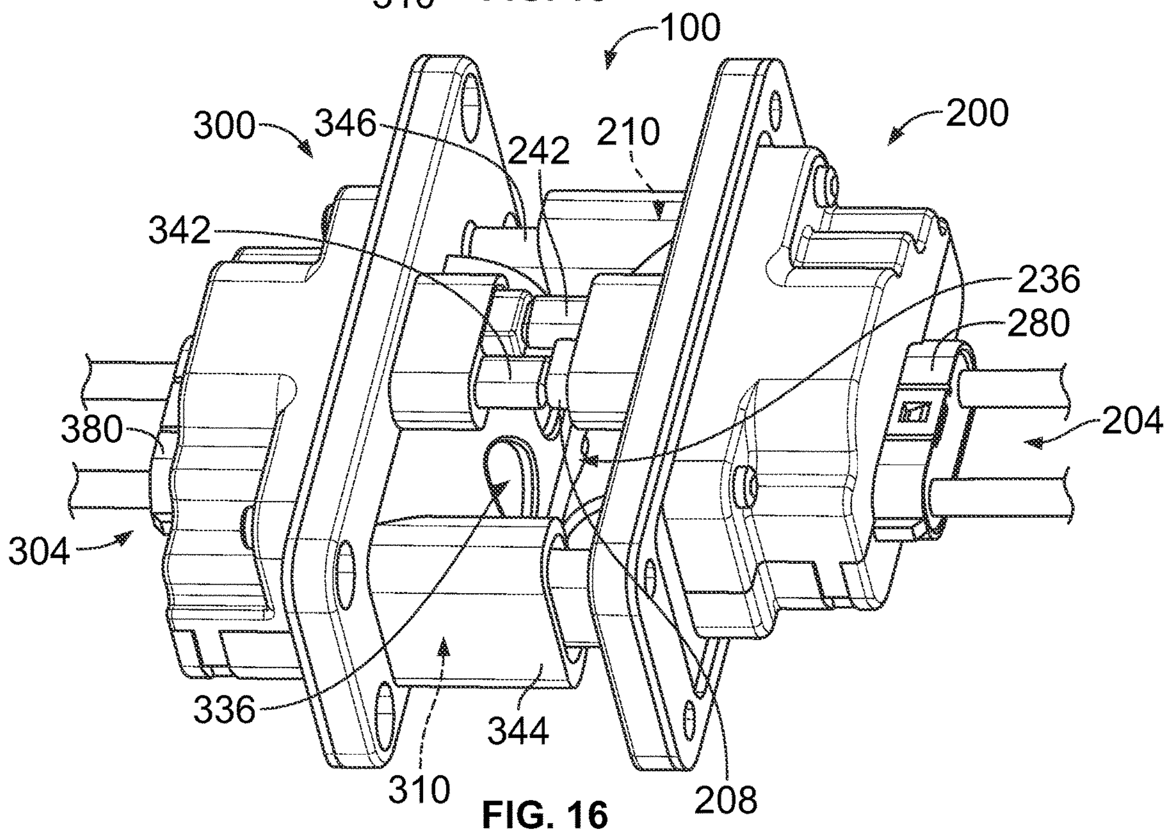
FIG. 16 illustrates an exemplary mating sequence for the first and second electrical connectors of the electrical connector system in accordance with an exemplary embodiment.
Figure 17:
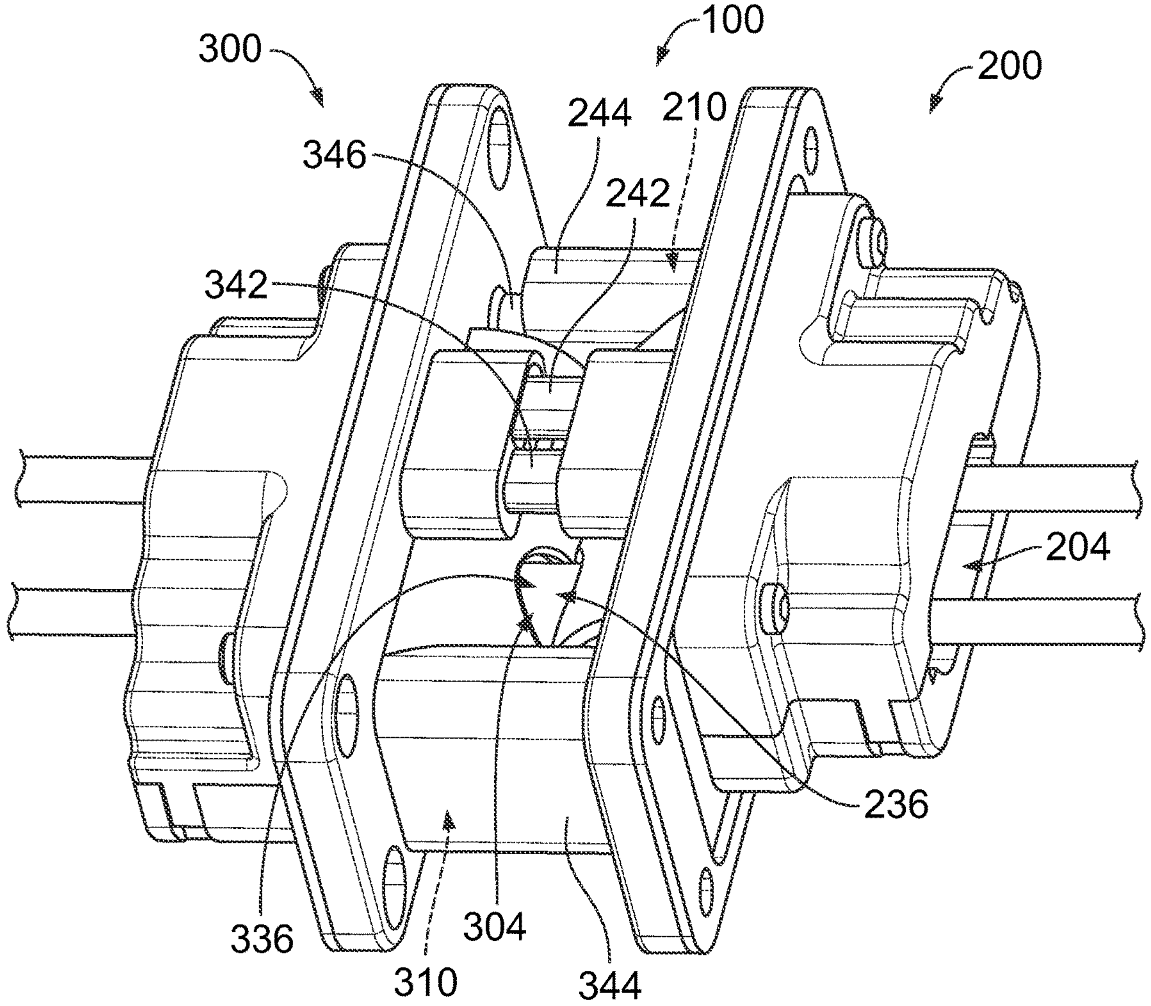
FIG. 17 illustrates an exemplary mating sequence for the first and second electrical connectors of the electrical connector system in accordance with an exemplary embodiment.

FIGS. 13-17 illustrate an exemplary mating sequence for the first and second electrical connectors 200, 300 of the electrical connector system 100 FIG. 13 illustrates the electrical connector system 100 in accordance with an exemplary embodiment showing the first and second electrical connectors 200, 300 poised for mating. FIG. 14 illustrates the electrical connector system 100 showing the first and second electrical connectors 200, 300 at an initial mating stage. FIG. 15 illustrates the electrical connector system 100 showing the first and second electrical connectors 200, 300 partially mated with the retractable covers in the closed positions. FIG. 16 illustrates the electrical connector system 100 showing the first and second electrical connectors 200, 300 partially mated with the retractable covers in the open positions and with the contact assemblies in the retracted positions. FIG. 17 illustrates the electrical connector system 100 showing the first and second electrical connectors 200, 300 fully mated with the contact assemblies in the advanced positions and mated with each other.

Prior to mating (FIG. 13) the first and second electrical connectors 200, 300 are generally aligned with each other. Optionally, guide features on the first and second electrical devices 102, 104 (shown in FIG. 1) may be used to provide gross alignment between the first and second electrical connectors 200, 300. When aligned, the first and second guide pins 246, 346 are generally aligned with the first and second guide sockets 244, 344.

When initially mated (FIG. 14), the first and second guide pins 246, 346 are received in the first and second guide sockets 244, 344. The guide pins 246, 346 and the guide sockets 244, 344 are the forwardmost portions of the electrical connectors 200, 300 and thus are the first structures to interface with each other during mating. The guide pins 246, 346 and/or the guide sockets 244, 344 may include chamfered lead-in surfaces to more accurately alignment the first and second electrical connectors 200, 300. The guide features are used to align other components of the electrical connectors 200, 300 for further mating. When initially mated, the first and second guide pins 246, 346 do not yet interface with the contact assembly actuators 210, 310.

As the first and second electrical connectors 200, 300 are further mated, the first and second cover actuators 208, 308 are engaged (FIG. 15) and actuated (FIG. 16). The hermaphroditic mating interfaces of the first and second electrical connectors 200, 300 align the first pusher 242 with the second cover actuator 308 and align the second pusher 342 with the first cover actuator 208. As the first and second electrical connectors 200, 300 are mated, the pushers 242, 342 press against the pushbuttons of the cover actuators 208, 308 to open the retractable covers 206, 306. After the retractable covers 206, 306 are opened (FIG. 16), the contact assemblies 204, 304 may be exposed to each other and are configured to be advanced for mating. Prior to opening the retractable covers 206, 306, the first and second guide pins 246, 346 do not yet interface with the contact assembly actuators 210, 310 and thus the contact assemblies 204, 304 are not advanced prior to opening the retractable covers 206, 306.

As the first and second electrical connectors 200, 300 are further mated to the fully mated position (FIG. 17), the first and second guide pins 246, 346 interface with the contact assembly actuators 210, 310. When the contact assembly actuators 210, 310 are actuated, the contact assemblies 204, 304 are advanced in the corresponding advancing directions (for example, toward each other) to mate the first contact assembly 204 with the second contact assembly 304. Portions of the contact holders 280, 380 (and corresponding contacts) are advanced through the openings 236, 336 to mate the contacts of the first and second electrical connectors 200, 300 and make electrical connection between the first and second electrical connectors 200, 300.

Figure 18:
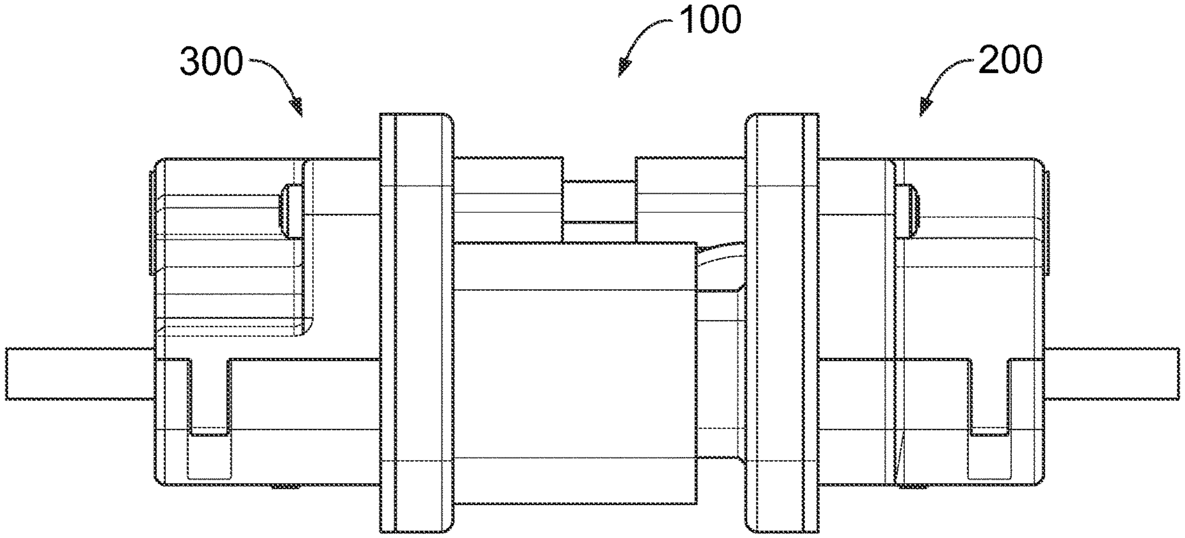
FIG. 18 is a side view of the electrical connector system in accordance with an exemplary embodiment showing the first and second electrical connectors in the fully mated state.
Figure 19:
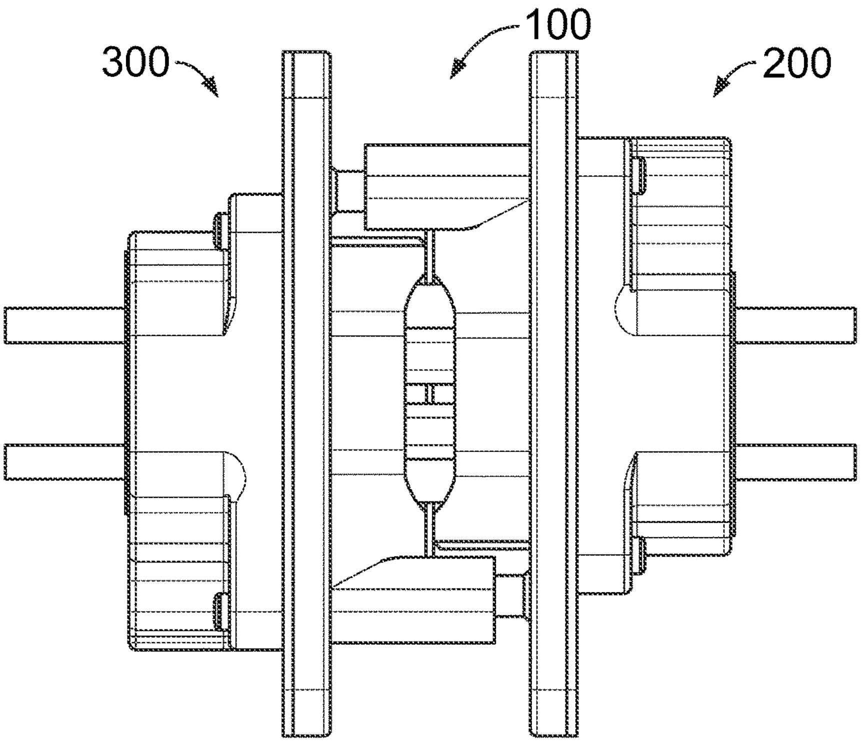
FIG. 19 is a top view of the electrical connector system in accordance with an exemplary embodiment showing the first and second electrical connectors in the fully mated state.

FIG. 18 is a side view of the electrical connector system 100 in accordance with an exemplary embodiment showing the first and second electrical connectors 200, 300 in the fully mated state. FIG. 19 is a top view of the electrical connector system 100 in accordance with an exemplary embodiment showing the first and second electrical connectors 200, 300 in the fully mated state.

Figure 20:
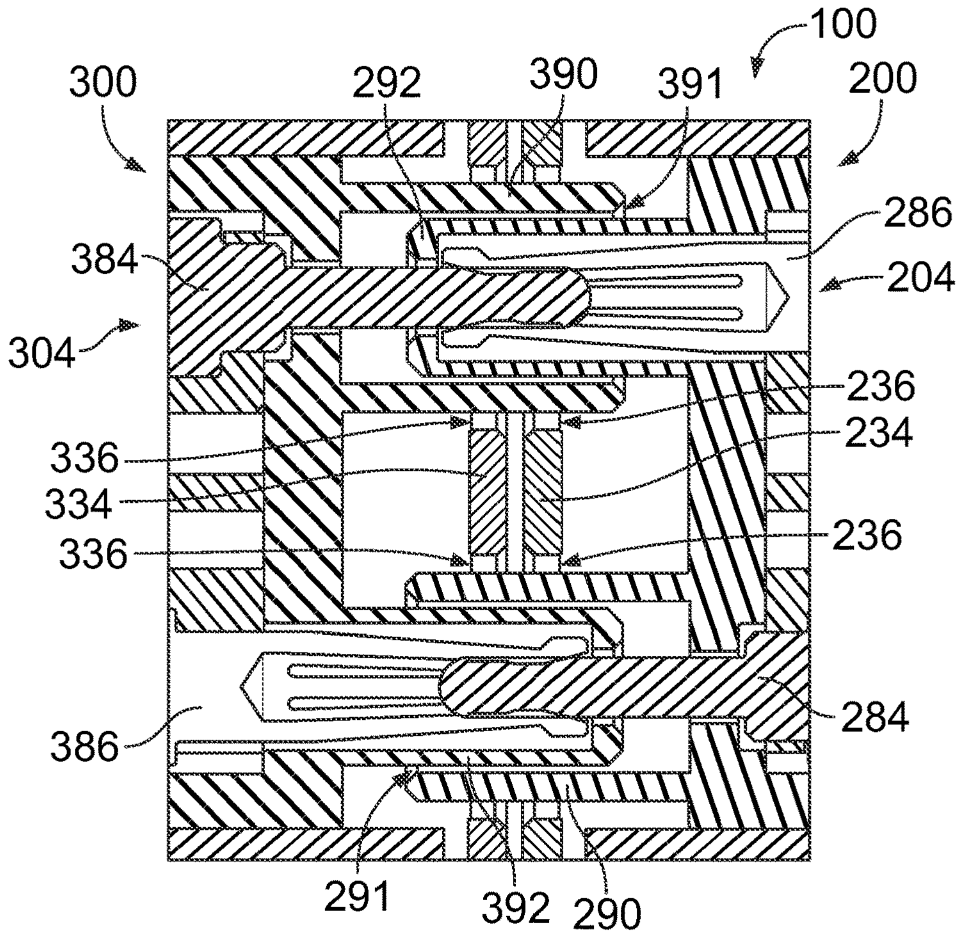
FIG. 20 is a cross-sectional view of a portion of the electrical connector system in accordance with an exemplary embodiment.

FIG. 20 is a cross-sectional view of a portion of the electrical connector system 100 in accordance with an exemplary embodiment. FIG. 20 illustrates the contact assemblies 204, 304 mated to each other. The first contact 284 (pin contact) of the first electrical connector 200 is mated to the second contact 386 (socket contact) of the second electrical connector 300. The second contact 286 (socket contact) of the first electrical connector 200 is mated to the first contact 384 (pin contact) of the second electrical connector 300. The first and second electrical connectors 200, 300 have hermaphroditic mating interfaces.

In an exemplary embodiment, the first silo 290 of the first electrical connector 200 receives the second silo 392 of the second electrical connector 300 in the receptacle 291. The first silo 390 of the second electrical connector 300 receives the second silo 292 of the first electrical connector 200 in the receptacle 391. The silos 290, 292, 390, 392 protect the contacts 284, 286, 384, 386. In an exemplary embodiment, as illustrated in FIG. 20, in the advanced position, the silos 290, 292 and contacts 284, 286 extend through the openings 236 and extend forward of the contact shroud 234 for mating with the second electrical connector 300. In the advanced position, the silos 390, 392 and contacts 384, 386 extend through the openings 336 and extend forward of the contact shroud 334 for mating with the first electrical connector 200.

Figure 21:
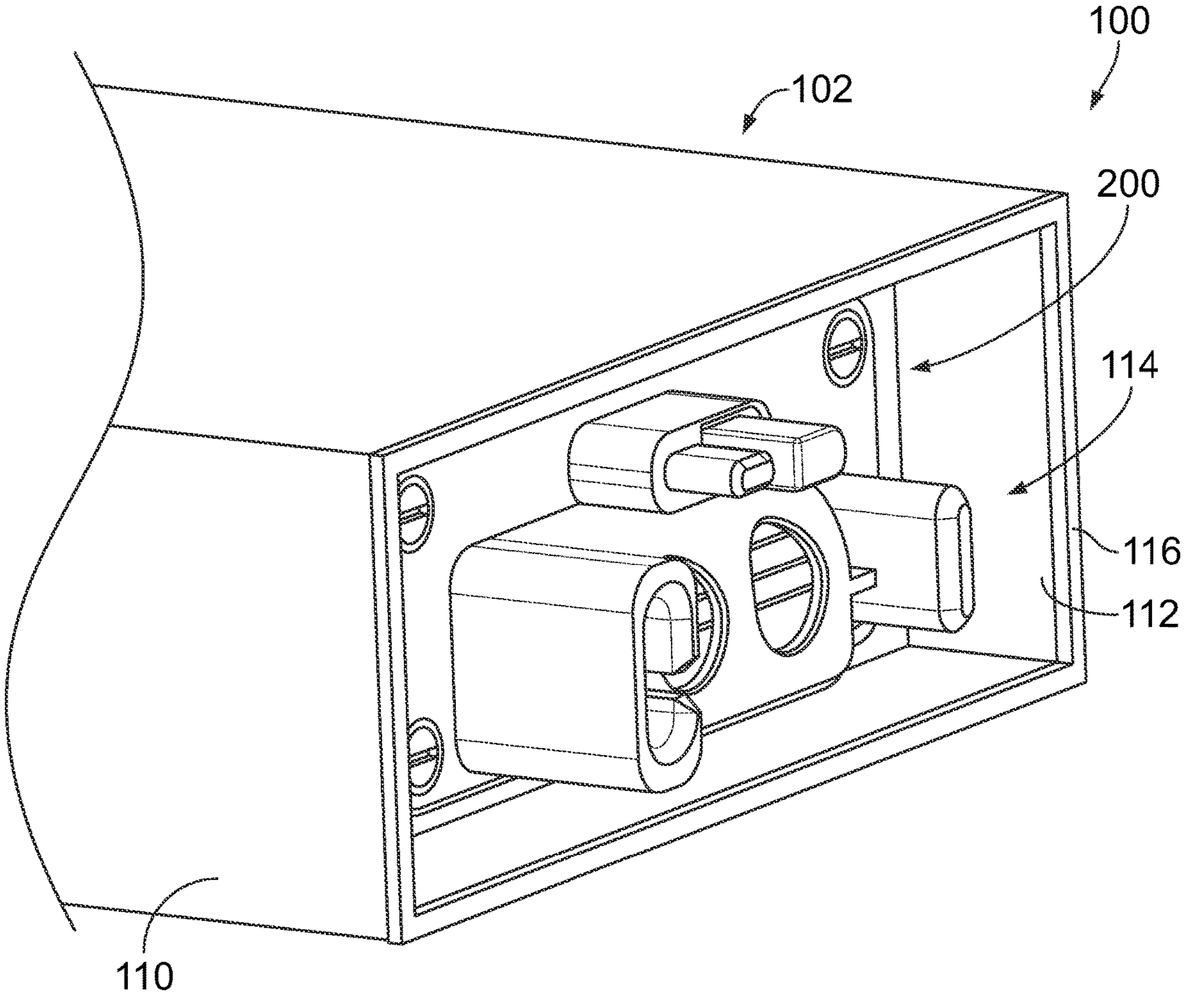
FIG. 21 illustrates a portion of the electrical connector system in accordance with an exemplary embodiment.

FIG. 21 illustrates a portion of the electrical connector system 100 in accordance with an exemplary embodiment. FIG. 21 illustrates the first electrical connector 200 coupled to a device housing 110 of the first electrical device 102. In the illustrated embodiment, the device housing 110 includes a device housing shroud 112 forming a shroud chamber 114. The first electrical connector 200 is located in the shroud chamber 114. The device housing shroud 112 protects the first electrical connector 200. In an exemplary embodiment, the device housing shroud 112 includes a device seal 116 configured to interface with the second electrical device 104 (shown in FIG. 1), such as to a device seal of the second electrical device 104 to provide a sealed interface between the first and second electrical connectors 200, 300.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a housing having a housing mating end at a front of the housing, the housing mating end including a hermaphroditic mating interface configured to be mated with a mating electrical connector having an identical mating interface, the housing having a contact cavity, the housing having a contact shroud at the housing mating end, the contact shroud including openings at the front;

a contact assembly received in the contact cavity, the contact assembly including a contact holder holding contacts, the contacts including mating ends aligned with corresponding openings of the contact shroud, the mating ends defining a hermaphroditic contact interface for mating with mating contacts of the mating electrical connector having an identical contact interface;

a retractable cover coupled to the housing, the retractable cover located at the contact shroud to close the openings, the retractable cover being movable relative to the housing between a closed position and an open position; and a cover actuator coupled to the housing, the cover actuator including a pusher at the housing mating end for interfacing with the mating electrical connector and an actuation element at the housing mating end for interfacing with the mating electrical connector, the actuation element being operably coupled to the retractable cover to move the retractable cover from the closed position to the open position, the pusher configured to interface with a complimentary actuation element of the mating electrical connector to actuate a retractable cover of the mating electrical connector.

2. The electrical connector of claim 1, wherein the cover actuator is actuated in an actuation direction, the retractable cover being opened in an opening direction perpendicular to the actuation direction.

3. The electrical connector of claim 1, wherein the pusher is located adjacent the actuation element on opposite sides of a central mating plane.

4. The electrical connector of claim 1, wherein the actuation element is pushed inward into the housing in a direction of mating with the mating electrical connector by a complementary pusher of the mating electrical connector.

5. The electrical connector of claim 1, wherein the retractable cover includes a plurality of cover sections connected by hinges, the cover sections being hingedly coupled to each other at the hinges, wherein the retractable cover is opened along a curved opening path.

6. The electrical connector of claim 1, wherein the housing includes a guide track, the retractable cover being received in the guide track, the guide track guiding movement of the retractable cover from the closed position to the open position.

7. The electrical connector of claim 1, wherein the cover actuator includes a return spring returning the retractable cover to the closed position when the actuation element is released.

8. The electrical connector of claim 1, wherein the actuation element includes a pushbutton configured to be pushed inward into the housing.

9. The electrical connector of claim 1, wherein the housing includes a guide socket at a first side of the contact shroud and a guide pin at a second side of the contact shroud, the guide socket configured to receive a mating guide pin of the mating electrical connector, the guide pin configured to be plugged into a mating guide socket of the mating electrical connector.

10. The electrical connector of claim 1, wherein the contact assembly includes a contact carrier having a first contact channel at a first side of the contact carrier and a second contact channel at a second side of the contact carrier, the contacts being held in the first and second contact channels, the contact carrier and the contacts being received in a rear chamber of the contact holder.

11. The electrical connector of claim 1, wherein the cover actuator includes a main body, the actuation element extending from the main body, the retractable cover extending from the main body, the housing including a cover chamber receiving the main body, the main body being movable within the cover chamber as the actuation element is actuated.

12. The electrical connector of claim 11, wherein the retractable cover is integral with the main body.

13. The electrical connector of claim 1, wherein the contact assembly is movable relative to the housing from a retracted position to an advanced position, the electrical connector further comprising a contact assembly actuator coupled to the housing, the contact assembly actuator including a contact assembly actuation element operably coupled to the contact assembly to move the contact assembly from the retracted position to the advanced position, the contact assembly actuation element being actuated by the mating electrical connector as the electrical connector is mated to the mating electrical connector to move the contacts of the contact assembly toward the mating electrical connector for mating the contacts with the mating contacts of the mating electrical connector.

14. The electrical connector of claim 13, wherein the housing includes a guide socket at a first side of the contact shroud and a guide pin at a second side of the contact shroud, the guide socket configured to receive a mating guide pin of the mating electrical connector, the guide pin configured to be plugged into a mating guide socket of the mating electrical connector, the contact assembly actuation element being located in the guide socket.

15. The electrical connector of claim 13, wherein the contact assembly actuation element includes a slide slidably coupled to the housing, the contact assembly actuator including a link between the slide and the contact holder, the link transferring the sliding movement of the slide to advancing movement of the contact assembly.

16. The electrical connector of claim 13, wherein the contact assembly actuator includes a return spring returning the contact assembly to the retracted position.

17. The electrical connector of claim 1, wherein the contacts include a first contact and a second contact, the first contact having a pin at the corresponding mating end, the second contact having a socket at the corresponding mating end, the first and second contacts being located on opposite sides of a central mating plane of the contact assembly.

18. The electrical connector of claim 17, wherein the contact holder includes a first silo covering the mating end of the first contact and a second silo covering the mating end of the second contact, the first silo being configured to receive a corresponding silo of the second mating connector.

19. The electrical connector of claim 1, wherein the housing includes a front housing and a rear housing, the rear housing being separate and discrete from the front housing, the rear housing being coupled to the front housing, the front housing including a flange configured to be mounted to an electrical device.

20. The electrical connector of claim 19, further comprising a gasket coupled to the flange configured to be sealingly coupled to the electrical device.

21. An electrical connector comprising:

a housing having a housing mating end at a front of the housing, the housing mating end including a hermaphroditic mating interface configured to be mated with a mating electrical connector having an identical mating interface, the housing having a contact cavity, the housing having a contact shroud at the housing mating end, the housing including a guide socket at a first side of the contact shroud and a guide pin at a second side of the contact shroud, the guide socket configured to receive a mating guide pin of the mating electrical connector, the guide pin configured to be plugged into a mating guide socket of the mating electrical connector;

a contact assembly received in the contact cavity, the contact assembly being movable relative to the housing from a retracted position to an advanced position, the contact assembly including a contact holder holding contacts, the contacts including mating ends defining a hermaphroditic contact interface for mating with mating contacts of the mating electrical connector having an identical contact interface; and a contact assembly actuator coupled to the housing, the contact assembly actuator including a contact assembly actuation element operably coupled to the contact assembly to move the contact assembly forwardly toward the mating electrical connector from the retracted position to the advanced position during mating, the contact assembly actuation element being actuated by the mating guide pin of the mating electrical connector as the electrical connector is mated to the mating electrical connector to move the contacts of the contact assembly toward the mating electrical connector for mating the contacts with the mating contacts of the mating electrical connector during mating.

22. An electrical connector system comprising:

a first electrical connector having a first housing, a first contact assembly, a first retractable cover, a first cover actuator, and a first contact assembly actuator, the first housing including a first hermaphroditic mating interface at a front of the first housing, the first housing having a first contact cavity and a first contact shroud at the front with first openings providing access to the first contact cavity, the first housing including a first guide socket and a first guide pin at the front of the first housing, the first contact assembly being received in the first contact cavity and movable relative to the first housing from a retracted position to an advanced position, the first contact assembly including a first contact holder holding first contacts including first mating ends defining a first hermaphroditic contact interface, the first retractable cover being coupled to the first housing at the first contact shroud to close the first openings, the first retractable cover being movable relative to the first housing between a closed position and an open position, the first cover actuator including a first pusher at the front of the first housing and a first actuation element at the front of the first housing operably coupled to the first retractable cover to move the first retractable cover from the closed position to the open position, the first contact assembly actuator including a first contact assembly actuation element operably coupled to the first contact assembly to move the first contact assembly from the retracted position to the advanced position; and a second electrical connector having a second housing, a second contact assembly, a second retractable cover, a second cover actuator, and a second contact assembly actuator, the second housing including a second hermaphroditic mating interface at a front of the second housing identical to the first hermaphroditic mating interface, the second housing having a second contact cavity and a second contact shroud at the front with second openings providing access to the second contact cavity, the second housing including a second guide socket and a second guide pin at the front of the second housing, the second contact assembly being received in the second contact cavity and movable relative to the second housing from a retracted position to an advanced position, the second contact assembly including a second contact holder holding second contacts including second mating ends defining a second hermaphroditic contact interface identical to the first hermaphroditic contact interface, the second retractable cover being coupled to the second housing at the second contact shroud to close the second openings, the second retractable cover being movable relative to the second housing between a closed position and an open position, the second cover actuator including a second pusher at the front of the second housing and a second actuation element at the front of the second housing operably coupled to the second retractable cover to move the second retractable cover from the closed position to the open position, the second contact assembly actuator including a second contact assembly actuation element operably coupled to the second contact assembly to move the second contact assembly from the retracted position to the advanced position;

wherein the first pusher actuates the second actuation element when the first and second electrical connectors are mated to open the second retractable cover and wherein the second pusher actuates the first actuation element when the first and second electrical connectors are mated to open the first retractable cover; and wherein the first guide pin actuates the second contact assembly actuation element when the first and second electrical connectors are mated to move the second contact assembly toward the first contact assembly to the advanced position and wherein the second guide pin actuates the first contact assembly actuation element when the first and second electrical connectors are mated to move the first contact assembly toward the second contact assembly to the advanced position, the first and second contacts being mated when the first and second contact assemblies are moved to the advanced positions.

* * * * *